(12) United States Patent
Garate Álvaro (10) Patent No.: US 8,527,453 B2
(45) Date of Patent: Sep. 3, 2013

(54) METHOD AND SYSTEM FOR PREDICTING THE OCCURRENCE OF A WIND GUST AT A WIND TURBINE (75) Inventor: José Miguel Garate Álvaro, Barcelona (ES)

(73) Assignee: Alstom Wind, S.L.U., Barcelona (ES)

( * ) Notice: Subject to any disclaimer, the term of this patent is extended or adjusted under 35 U.S.C. 154(b) by 0 days.

(21) Appl. No.: 13/318,582

(22) PCT Filed: May 11, 2010

(86) PCT No.: PCT/EP2010/056432
§ 371 (c)(1),
(2), (4) Date: Nov. 2, 2011

(87) PCT Pub. No.: WO2010/130721
PCT Pub. Date: Nov. 18, 2010

(65) Prior Publication Data
US 2012/0059638 A1 Mar. 8, 2012

(30) Foreign Application Priority Data

May 14, 2009 (EP) .................................... 09160250

(51) Int. Cl.
G06F 15/00 (2006.01)
G06F 15/18 (2006.01)
(52) U.S. Cl.
USPC .............................................. 706/62; 290/44
(58) Field of Classification Search
None
See application file for complete search history.

(56) References Cited

U.S. PATENT DOCUMENTS

| | | | |
|---|---|---|---|
| 6,909,198 B2 | 6/2005 | Ragwitz | |
| 2002/0087234 A1* | 7/2002 | Lof et al. | 700/286 |
| 2003/0160457 A1* | 8/2003 | Ragwitz et al. | 290/44 |
| 2007/0067067 A1 | 3/2007 | Stommel | |
| 2007/0124025 A1 | 5/2007 | Schram | |
| 2009/0047116 A1 | 2/2009 | Barbu | |
| 2009/0224542 A1* | 9/2009 | Nim | 290/44 |

FOREIGN PATENT DOCUMENTS

| | | |
|---|---|---|
| EP | 1767781 | 3/2007 |
| WO | 0205041 | 1/2002 |
| WO | 2007137137 | 6/2007 |
| WO | 2007138138 | 12/2007 |

OTHER PUBLICATIONS

Costa A et al: "A review on the young history of the wind power short-term prediction" Renewable and Sustainable Energy Reviews, Elseviers Science, New York, NY, US, vol. 12, No. 6, Aug. 1, 2008, pp. 1725-1744, XP022638001, ISSN: 1364-0321.

* cited by examiner

Primary Examiner — Kakali Chaki
Assistant Examiner — Luis Sitiriche
(74) Attorney, Agent, or Firm — Squire Sanders (US) LLP (57) ABSTRACT A method of predicting the occurrence of a wind gust at a wind turbine is described. The values of at least one parameter measured for the wind turbine as input data are obtained on a predetermined frequency. A group of input data of predetermined size that was most recently obtained is selected. The probability of the occurrence of a wind gust is calculated based on the selected group of input data. The calculated probability that a wind gust will occur is verified to be above a predetermined probability level. And the occurrence of the wind gust is predicted.

10 Claims, 9 Drawing Sheets

METHOD AND SYSTEM FOR PREDICTING THE OCCURRENCE OF A WIND GUST AT A WIND TURBINE

CROSS-REFERENCE TO RELATED APPLICATIONS

The application claims priority to PCT Application No. PCT/EP2010/056432 entitled "Method And System For Predicting The Occurrence Of A Wind Gust At A Wind Turbine," filed May 11, 2010 which claims priority to European Patent No. 09160250.8 entitled "Method And System For Predicting The Occurrence Of A Wind Gust At A Wind Turbine," filed May 14, 2009.

TECHNICAL FIELD

The present invention relates to a method and system for predicting the occurrence of a wind gust at a wind turbine.

Modern wind turbines are commonly used to supply electricity into the electrical grid. Wind turbines of this kind generally comprise a rotor with a rotor hub and a plurality of blades. The rotor is set into rotation under the influence of the wind on the blades. The rotation of the rotor shaft either directly drives the generator rotor ("directly driven") or through the use of a gearbox.

Many modern wind turbines are operated in variable speed operation. This means that the rotor shaft speed can vary with changing wind conditions. Control of the wind turbine (and rotor shaft speed) with variable speed operation is usually carried out using the wind turbine's pitch control and the generator torque. With the pitch control, the angle of attack of the blades can be controlled to increase or decrease aerodynamic torque on the blades. With the generator, the (electro) magnetic torque at the opposite end of the drive train can be increased or decreased. It should be noted that due to the inertia of the system, the pitch control will always react with a little delay to a change in wind speed and will also have a maximum pitch rate (i.e. a maximum rate at which the pitch angle can be changed). The generator torque can be adjusted more quickly, but will also have a maximum rating depending on the generator and power electronics employed.

Now, a typical control in variable speed wind turbines will be described. In the operation below rated wind speed, the rotor shaft speed is mainly controlled by the generator torque. The blades are set such that they have the optimum angle of attack, capturing the maximum possible torque under changing wind conditions. The generator torque is varied to control the rotor shaft speed. In operation at rated and above rated wind speed, the pitch control of the wind turbine blades is used to limit the aerodynamic torque on the rotor. The pitch angle is increased (the blades are directed towards their vane position) with increasing wind speed. Depending on the generator rating, the generator torque may also be used to control the rotor shaft speed.

BACKGROUND

It is well known that wind speeds are not constant and may vary significantly from one moment to the next. It is important that control of the wind turbine (whether it is a variable speed wind turbine or a constant speed wind turbine) can be effectuated to adapt for changing wind conditions. Regardless of which type of control is chosen, adapting the control to a wind gust remains problematic. Especially a so-called "Mexican hat" wind gust, as defined in the standard IEC 64100-1 $2^{nd}$ edition 1999-02 can cause problems. Such a wind gust has been depicted in FIG. 1. A slight decrease in wind speed is followed by a sudden increase in wind speed. With the variable speed operation described before, the initial reaction will be to decrease the pitch angle (to increase the angle of attack of the blades). When the pitch angle has been decreased, a sudden increase of wind speed occurs. The pitch control will pitch at highest possible pitch rate to decrease the aerodynamic torque. Frequently however, the maximum pitch rate will not be high enough to properly react to the wind gust. This may lead to high loads on the wind turbine and may also lead to disconnection of the wind turbine from the grid. It is of course undesirable that wind turbines suffer high loads and frequently have to be disconnected from the grid due to wind gusts.

In the prior art, various attempts have been made to alleviate previously mentioned problems. US 2007/0067067 describes installing so-called SODAR devices capable of measuring the wind speed upstream of the wind turbine rotor. US 2009/0047116 describes installing a LIDAR device installed in the wind turbine hub, also with the goal of measuring the wind speed upstream of the wind turbine. The main disadvantage of these systems is that separate dedicated systems are needed, which represent an extra cost. US 2007/0124025 describes another system, in which the control of a wind turbine uses data from other wind turbines located upstream of the wind turbine. This system however depends on the presence of other wind turbines, and does not solve the problem for the wind turbines that are placed upstream from other wind turbines.

U.S. Pat. No. 6,909,198 describes a method for processing and/or predicting flow data of a flowing medium, in which from values of at least one flow parameter which are successively measured on a continuous basis at one or various locations in the medium, said flow parameter being characteristic for the speed of the medium, a time series is formed and updated which is subjected to a nonlinear deterministic prediction procedure on the basis of a locally constant phase space model for generating prediction values for the respective subsequent flow parameters, wherein a predetermined control signal is generated if the prediction values for an impending change in flow speed. Because this method is based upon a nonlinear deterministic prediction procedure, the computational capacity necessary in order to properly carry out this method is very high. The computer able to carry out the predictions may therefore be expensive.

Another prior art method is described in WO 2007/138138. According to this method, the pitch of the blade is controlled (as if under extreme wind gust conditions) whenever the instantaneous acceleration of the generator is above a predetermined threshold. A disadvantage of this method is however that the detection of a wind gust is reduced to a simple measurement of only the acceleration of the generator. Any other factor, that may indicate a wind gust is not occurring is ignored. Additionally, the criterion only takes into account a single extreme wind gust. Any other wind gust will not be detected.

SUMMARY

It is an object of the present invention, to provide a method and system for predicting the occurrence of a wind gust at a wind turbine which does not suffer from the previously mentioned disadvantages. Predicting the occurrence of a wind gust in this respect does not necessarily mean that a wind gust is predicted before a wind gust occurs, rather it is to be interpreted as realizing that a wind gust is occurring or will occur before the wind gust harms or can potentially harm the wind turbine.

In a first aspect, the present disclosure refers to a method of predicting the occurrence of a wind gust at a wind turbine comprising: obtaining, with a predetermined frequency, the values of at least one parameter measured for the wind turbine as input data; selecting a group of input data of predetermined size that was most recently obtained; calculating the probability of the occurrence of a wind gust on the basis of said selected group of input data; verifying if the calculated probability of the occurrence of a wind gust is above a predetermined probability level; and predicting the occurrence of a wind gust if the calculated probability is above said predetermined probability level.

To predict a wind gust, values of at least one parameter generally measured in the wind turbine are obtained. Said at least one parameter measured for the wind turbine may be e.g. wind speed, generator power, rotor shaft speed (but may also comprise other parameters). Based on the most recently obtained values for these parameters, a probability that a wind gust occurs is calculated. If the calculated probability is above a certain predetermined threshold, a wind gust is predicted. Subsequently, the control of the wind turbine may then be adapted to account for the wind gust. A major advantage of the invention is that no separate system (such as LIDAR or SODAR) needs to be installed to be able to carry out the invention. Additionally, the data necessary for the control may be obtained at the wind turbine itself and the data do not need to be supplied from e.g. another wind turbine. Another advantage of the present invention is that merely a probability is calculated, which requires less computational capability than with a deterministic model (wherein a complete prediction of how the wind speed will develop, whether it is a wind gust or not, needs to be carried out continuously). The calculations, necessary for the present invention, can be carried out with modest (relatively cheap) computational capability. Finally, the probability that a wind gust occurs at the wind turbine itself (the wind turbine's precise location) can be calculated, instead of measuring wind gusts upstream of the wind turbine. The invention does not depend on the presence of wind turbines or other equipment upstream.

In some embodiments, calculating the probability of the occurrence of a wind gust on the basis of said selected group of input data comprises using an algorithm for determining the resemblance between the selected group of input data and data relating to one or more predetermined wind gusts. Preferably in these embodiments, said one or more predetermined wind gust are wind gusts defined in the standard IEC 61400. This IEC (International Electrotechnical Commission) standard relates to wind turbines and specifies e.g. loads (such as from a wind gust) a wind turbine has to be able to withstand. This IEC standard may change to adapt for increased know-how in the field of wind turbines. One preferred way of determining the probability of the occurrence of a wind gust is by determining the resemblance of the development of a parameter (or parameters) with a pattern of the same parameter(s) under wind gust conditions. Using an algorithm that determines the resemblance between patterns is a relatively easy way to determine the probability that a wind gust is occurring (more resemblance leads to a higher probability). Preferably, in such a method, the resemblance with a pattern of said parameter(s) under a wind gust as defined in the relevant standard is determined (since the standard will probably define the design load defining cases). The standard IEC 61400-1 $2^{nd}$ edition 1999-02 specifies e.g. so-called Mexican hat wind gusts as significant, since these wind gusts may potentially be damaging.

Preferably in these embodiments, the algorithm for determining the resemblance between patterns is obtained using artificial neural networks. Artificial neural networks are non-linear statistical data modeling tools, which are particularly suitable for finding patterns in data. In a training phase of an artificial neural network (hereinafter "neural network"), the network learns which patterns to recognize. For example, in a wind gust, the wind speed will follow a pattern comprising a steep increase in wind speed. Similarly, a parameter such as the rotor speed may follow a typical pattern under wind gust conditions. Within the scope of the invention, any parameter, or any combination of parameters measured for the wind turbine may be chosen to detect wind gust patterns in the training phase.

In some embodiments, obtaining, with a predetermined frequency, the values of at least one parameter measured for the wind turbine as input data comprises obtaining input on the value of wind speed at the nacelle of said wind turbine and/or rotor shaft speed and/or generator power. The wind speed appears to be the most logical parameter to measure. However, since the wind speed is normally determined with an anemometer located on the nacelle, the wind speed measured at the nacelle is highly influenced by the flow of the wind around the blades. The rotor shaft speed and generator power may be more reliable in this sense. On the other hand, due to the inertia of the hub and blades, the effects of a wind gust are not as quickly registered as a change in wind speed. A combination of these parameters (e.g. generator power and wind speed) is a preferred option. However, within the scope of the invention, different combinations of parameters, or different parameters (such as pitch angle, or generator rotor speed) may also be selected. The algorithm used for calculating the probability (and probability threshold) will have to be adapted to the selected parameter(s).

In some embodiments, the predetermined frequency of obtaining input data is between 10 and 1000 times per second, preferably between 10 and 100 times per second, more preferably approximately 20 times per second. The chosen frequency of obtaining input data should be a balance between the delay of the prediction and computational capacity available. Within the control centre of a wind turbine (which may either be located at the wind turbine site or remotely), a number of operational tasks need to be carried out and monitored. For this reason, there is a desire of reducing computational capacity (and thus reducing the frequency of obtaining input data) dedicated to the prediction of wind gusts. On the other hand however, with a higher frequency, a potential wind gust may be more quickly recognizable. It has been found that e.g. With a frequency between 10 and 100 times per second, a good balance can be obtained.

In some embodiments, said group of predetermined size of input data covers a period of between 1 and 10 seconds, preferably between 2 and 8 seconds, more preferably of approximately 5 seconds. The period of data that is taken into account to calculate the probability of a wind gust occurring should be balanced between the speed with which a wind gust can be predicted and the reliability of the prediction. If a longer period is taken into account, the result of the probability calculation may be much more reliable, but the result of the calculation may be obtained too late to be able to react. The optimum period to be taken into account may depend on e.g. the chosen parameters (wind speed, generator power, combinations etc.), the type of wind gust to be detected, the prevailing wind speed at the moment of a wind gust etc. It has been found that for most purposes and most applications, a period of between 1 and 10 second, and preferably between 2 and 8 second leads to good results.

In preferred embodiments, predetermined probability level (threshold) is between approximately 40% and approximately 85%. If the calculated probability is above the predetermined threshold, a wind gust is predicted, and appropriate actions can be undertaken. If the calculated probability is below the threshold, no wind gust is predicted and the normal wind turbine control is not affected. The chosen threshold will be a balance between the speed with which a wind gust can be predicted and the reliability of the prediction. If the chosen threshold is low, the calculated probability level will more easily reach to this level and a wind gust may thus be predicted quickly. On the other hand, it is more likely that a wind gust is predicted when no wind gust is actually occurring. It has been found that probability levels between substantially 40% and substantially 85% lead generally to good results. The chosen probability level may depend e.g. on the parameters chosen, the frequency of obtaining data, the period taken into account for the calculation of probability, the type of wind gust to be detected etc.

In another aspect, the disclosure provides a method of controlling a wind turbine, comprising the method of predicting the occurrence of a wind gust, and further comprising: if the occurrence of a wind gust is predicted, adapting a pitch control and/or generator torque of a wind turbine to such a wind gust. In a variable speed wind turbine, the two parameters to control the wind turbine are generally the pitch and the generator torque. When a wind gust is predicted, in an attempt to limit the loads on the wind turbine and avoid interrupting operation of the wind turbine, the pitch of the blades will be increased in order to reduce the aerodynamic loads and the generator torque will be increased to slow down the rotor shaft. However, the most appropriate control strategy may differ in different kind of wind turbines. For example, not all turbines have pitch capability. Also in this kind of turbines, the method of predicting the occurrence of a wind gust may be useful. As soon as a wind gust is predicted appropriate action may be undertaken (e.g. braking, using flaps if provided on the blades, disconnection from the grid etc.).

According to yet another aspect, the disclosure provides a computer program comprising program instructions for causing a computer to perform a method of predicting the occurrence of a wind gust. Said computer program may be embodied on a storage medium (for example, a USB drive, a CD-ROM, a DVD, on a computer memory or on a read-only memory).

Finally, the present disclosure also relates to a computer system for predicting the occurrence of a wind gust, comprising: a module for obtaining, with a predetermined frequency, input data on the values of at least one parameter measured in the wind turbine; a module for selecting a group of input data of predetermined size that was most recently obtained; a module for calculating the probability of the occurrence of a wind gust on the basis of said selected group of input data; a module for verifying if the calculated probability of the occurrence of a wind gust is above a predetermined probability level; and a module for predicting the occurrence of a wind gust if the calculated probability is above said predetermined probability level. The means for obtaining input data may be located in the wind turbine nacelle, or remotely and it may employ wireless technology. The input may be obtained from any kind of available sensor, and preferably from sensors normally available on wind turbines. Also the processing means used for calculations etc. may be located remotely or on site. Any kind of suitable micro processing system, or any kind of computing device or system may be used.

DESCRIPTION OF THE DRAWINGS

Particular embodiments of the methods of predicting wind gusts will be described in the following, only by way of non-limiting example, with reference to the appended drawings, in which.

DETAILED DESCRIPTION

Figure 1:
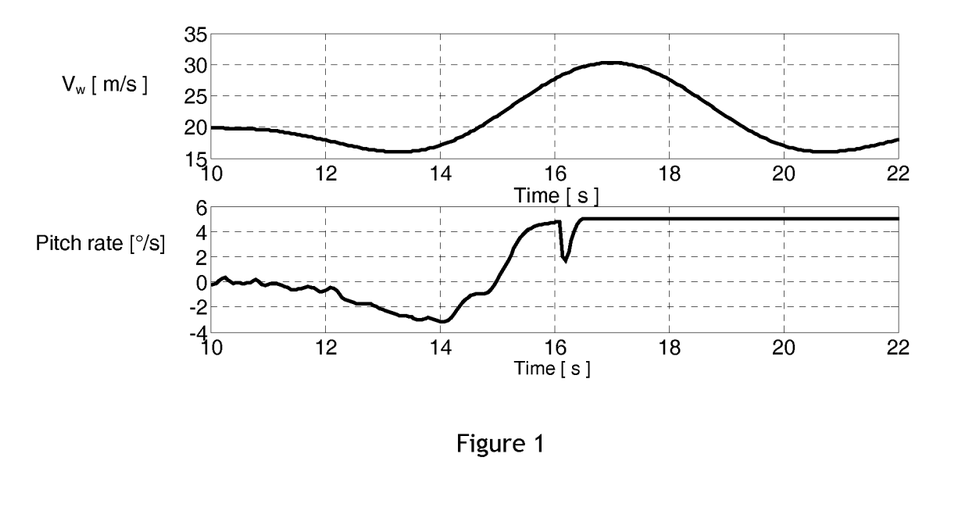
FIG. 1 describes a "Mexican hat" wind gust and the pitch control during such a wind gust.

FIG. 1 describes a "Mexican hat" wind gust and the pitch control (the evolution of the pitch rate) during such a wind gust. Mexican hat wind gusts are defined in the iec 64100-1 $2^{nd}$ edition 1999-02 standard, since they may be dangerous wind gusts. The loads a wind turbine suffers during such a wind gust are severe and may define design loads for the wind turbine. This is due to the decrease in wind speed, before the high increase in wind speed (see FIG. 1). When the wind speed decreases, the pitch is adapted to this decrease (the blades are rotated in such a way to increase the aerodynamic torque, the pitch rate is below zero). With the adapted pitch, a significant increase in wind speed occurs. The aerodynamic torque on the hub can thus be very high. The pitch of the wind turbine will start to adapt to these changing wind conditions. However, the wind speed keeps increasing and due to the inertia of the system, the pitch cannot be adapted quickly enough. It can be seen in FIG. 1, that relatively soon the pitch control is at its maximum pitch rate of approximately 5° per second. The loads on the turbine are high and even leads to an interruption of the operation of the wind turbine in this case. As can be seen in FIG. 1, the blades are then rotated to their vane position at the maximum pitch rate. It is thus clear that especially this kind of wind gust should be detected as soon as possible to avoid problems. If the wind gust can be readily detected, the control of the wind turbine can be adapted in time, so that the loads can be reduced and the wind turbine operation does not need to be interrupted.

Figure 2:
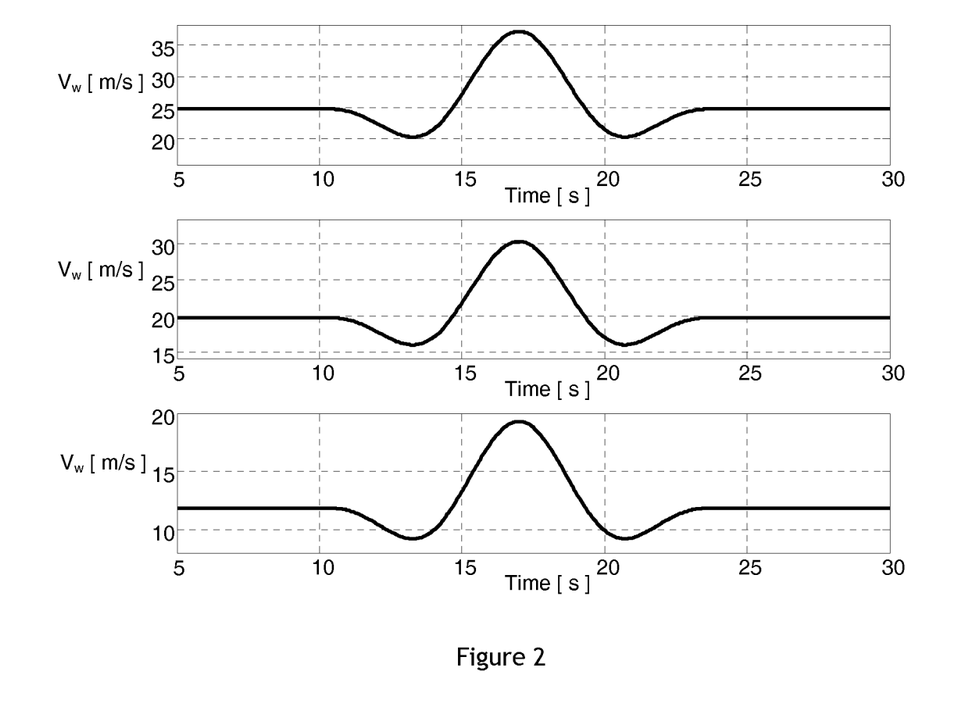
FIG. 2 describes Mexican hat wind gusts occurring at various wind speeds.

FIG. 2 describes Mexican hat wind gusts occurring at various wind speeds. The effects and loads on the wind turbine are different at different wind speeds and at different azimuth angles. Therefore, the IEC 64100-1 $2^{nd}$ edition 1999-02 standard defines Mexican hat wind gusts at various speeds, and at various azimuth angles. The probability calculation according to the present invention may be especially aimed at these wind gusts. In the remainder of the application, focus will be on the Mexican hat wind gusts. It should be borne in mind however, that in other embodiments of the invention, the type of wind gust to be predicted may be different.

According to the present disclosure, the method of predicting the occurrence of a wind gust at a wind turbine comprises: obtaining, with a predetermined frequency, the values of at least one parameter measured for the wind turbine as input data; selecting a group of input data of predetermined size that was most recently obtained; calculating the probability of the occurrence of a wind gust on the basis of said selected group of input data; verifying if the calculated probability of the occurrence of a wind gust is above a predetermined probability level; and predicting the occurrence of a wind gust if the calculated probability is above said predetermined probability level. The calculation of the probability may be carried out in various ways. In a preferred embodiment, the algorithm to carry out the probability is based on the resemblance of a pattern of at least one parameter under wind gust conditions, with the pattern a parameter is following instantaneously. Various parameters may be chosen. For example, the wind speed measured at the nacelle will follow a determined pattern if a wind gust is occurring. However, the same is true e.g. for the pitch angle, the rotor speed, the generator output and others. Preferably, parameters or combinations of parameters that are measured for any wind turbine are used, such that no additional systems need to be installed to be able to carry out the invention.

Figure 3:
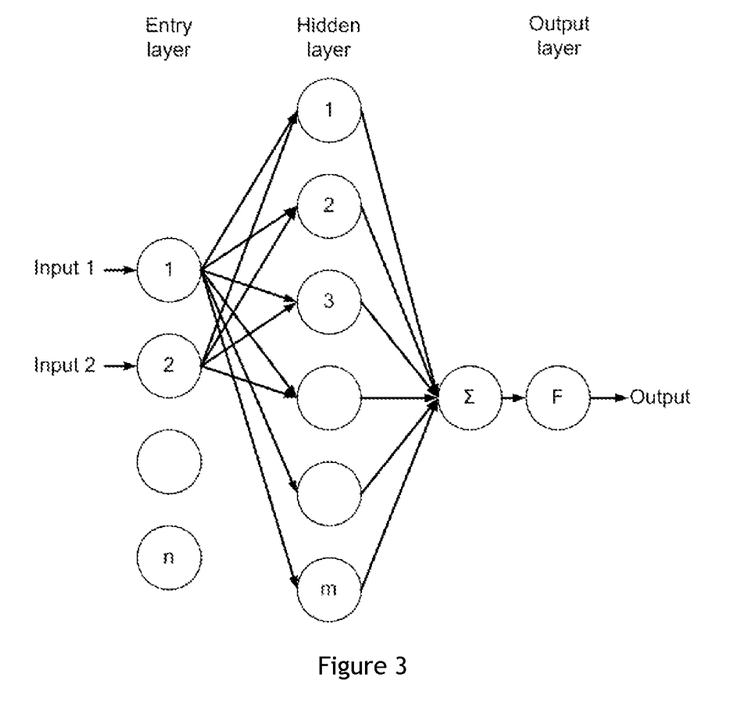
FIG. 3 illustrates an artificial neural network.

Algorithms for determining the resemblance between patterns may be determined or obtained in various different ways. One particularly powerful way of obtaining such an algorithm is through an artificial neural network. Neural networks may comprise various layers. In FIG. 3, two of such layers are depicted (but within the scope of the present invention, the number of layers may differ). Data of e.g. a parameter such as wind speed is used as input. Each of the input data is then multiplied by different constants (synaptic weights) in the input layer. The outcomes of the multiplication process are, in the hidden layer, once again multiplied by various different constants. The outcome of the multiplication process is summed and fed into a so-called activation function F. The outcome of the activation function F gives the output of the neural network.

In order to train a neural network to recognize patterns, a training process needs to be carried out. In such a training process, various pre-programmed input patterns and their desired outcome value are fed into the neural network. Taking these data, the neural network will adapt the values of the various synaptic weights in the various layers to give the desired output for the given input. In order to train the neural network to recognize e.g. Mexican hat wind gusts, the patterns of wind speed such as depicted in FIG. 2 may be fed into the neural network, wherein the desired output is set to 1 (a probability of 100%). Also, in the training process, other wind speed patterns (such as constant speed of 12 m/s) may be fed into the neural network, wherein the desired output is set to 0 (a probability of 0%). During the training process, the neural network will adapt the values of the various "weights" in order to give the desired outcomes. Different training processes are known for neural networks. Their theory, advantages and disadvantages are known to the skilled person and their explication falls outside the scope of this description. For more information, the interested reader is referred to e.g. "Neural Networks for Modelling and Control of Dynamic Systems" (Authors: M. Nørgaard, O. Ravn, N. K. Poulsen and L. K. Hansen. ISBN 1-85233-227-1) or other handbooks on neural networks. Also with respect to the most appropriate activation function, the number of layers of the neural network, and the number of synaptic weights in the various layers, the reader is referred to these same handbooks. Within the scope of the present invention, these may be varied depending on e.g. the type of wind gust to be detected, the parameters chosen as input data, the probability threshold applied etc.

Figure 4:
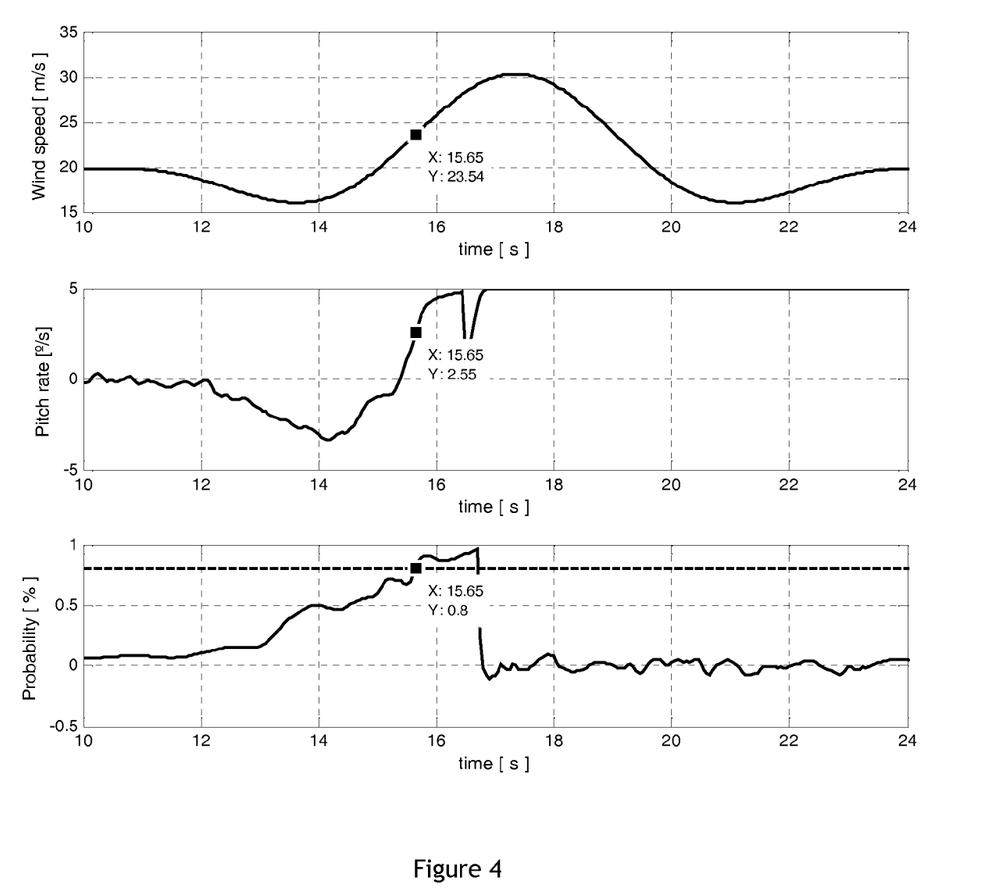
FIGS. 4 and 5 describe the prediction of a wind gust based on the wind speed measured at the nacelle using methods according to the present invention.
Figure 5:
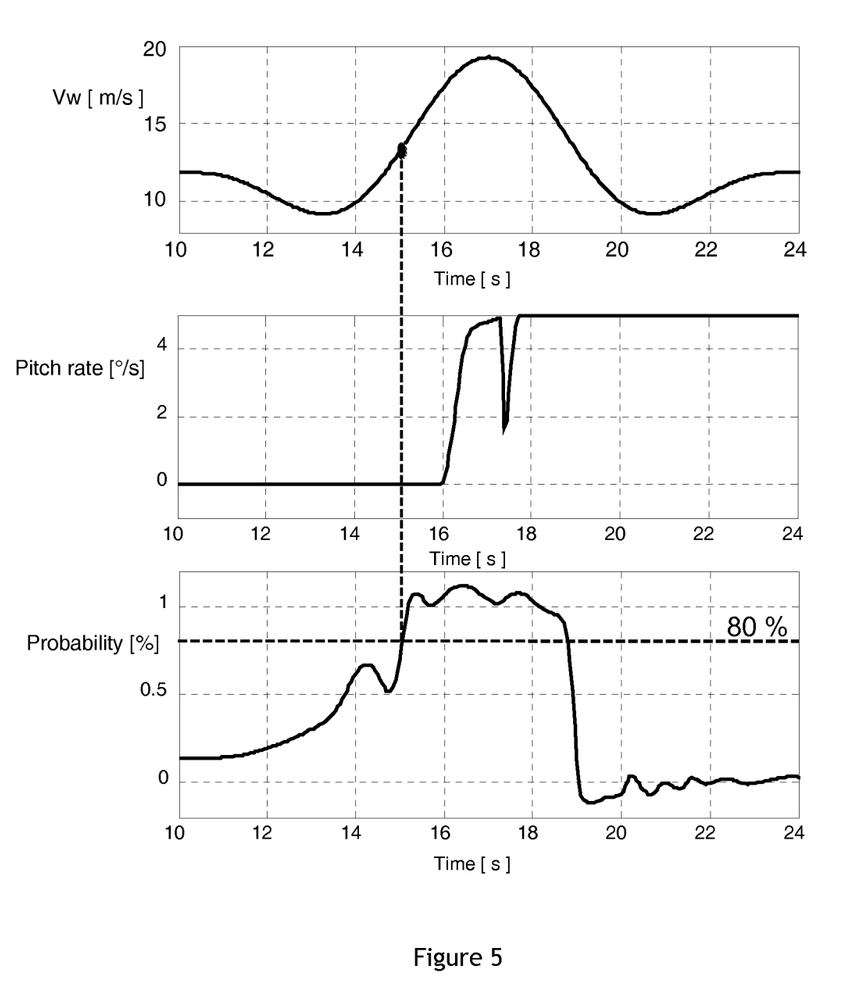

Once a neural network has been trained to detect predetermined patterns of a parameter (or combination of parameters), the synaptic weights, in combination with the activation function result in an algorithm which for any pattern of the chosen parameter(s) can calculate the probability that a predetermined phenomena (in this case, the Mexican hat wind gust) is occurring. This is illustrated in FIGS. 4 and 5. These figures describe the prediction of a wind gust based on the wind speed measured at the nacelle using methods according to the present invention.

In FIG. 4, it can be seen that, using a probability threshold of 80%, and based only on the wind speed, the occurrence of a wind gust is predicted after approximately 5 seconds. At that point, the wind turbine control can be adapted e.g. by pitching at maximum pitch rate and increasing torque in order to slow down the turbine before the high increase in wind speed (this is not shown in FIG. 4).

A similar speed (or delay) of prediction can be seen in FIG. 5. The wind speed at which the wind gust occurs however was 12 m/s (approx. 20 m/s in FIG. 4). The wind gust is predicted after approximately the same time, however due to the lower wind speed, the pitch was not actuated (was not decreased such as to increase aerodynamic torque) before the wind gust is predicted. The imminent increase of wind speed can therefore be adjusted for without problems (although this is not shown in FIG. 5).

Within the scope of the present disclosure, the probability threshold may be lowered (such as to predict the wind gust and react sooner). On the other hand, it will become more likely that a wind gust is predicted, whereas no wind gust will occur. Another option to increase the prediction speed may be to use more than one parameter. Also, variations may be made in the time period taken into account as input, or the frequency with which the input data is obtained.

Figure 6:
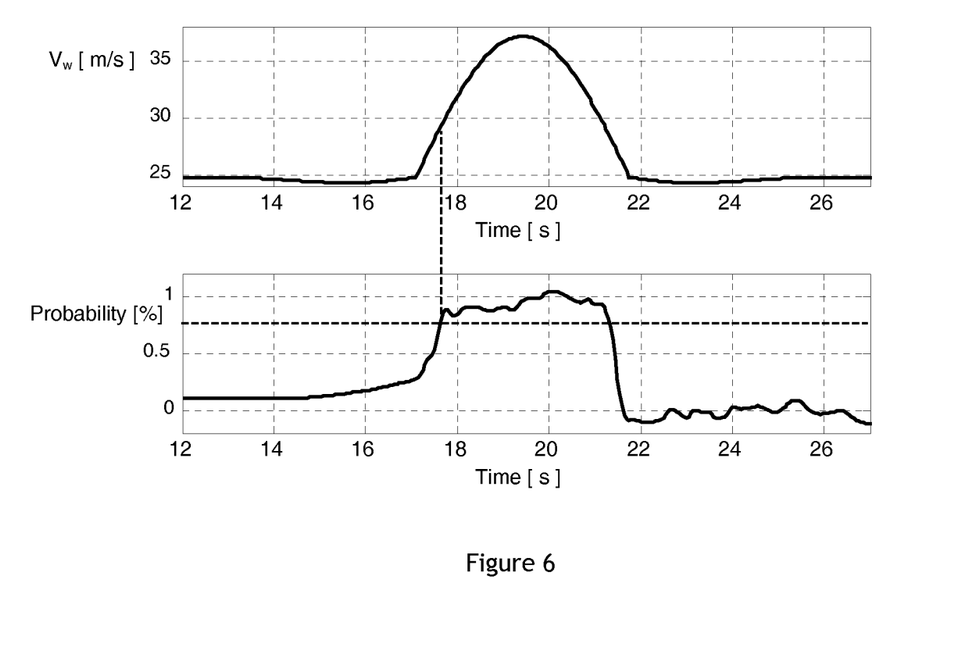
FIGS. 6 and 7 illustrate which wind speed variables are and which are not recognized as wind gusts in an embodiment of the invention.
Figure 7:
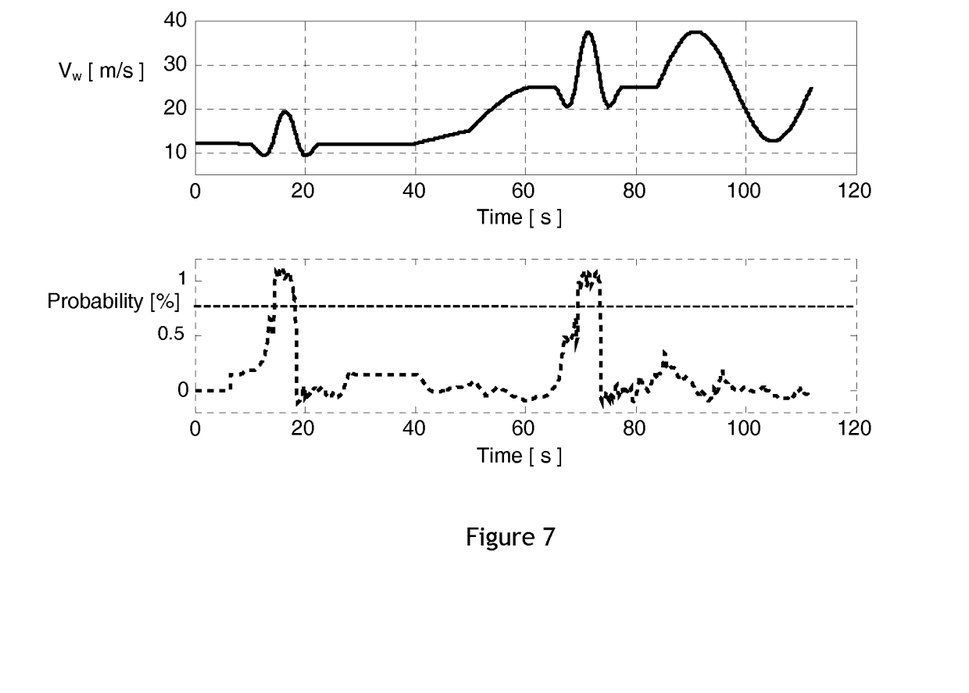

FIGS. 6 and 7 serve to illustrate which wind speed patterns are and which are not recognized as wind gusts with the same algorithm as before. (The threshold level is still kept at 80% and only the wind speed is taken into account). In FIG. 6, a slightly deformed Mexican hat wind gust is predicted. FIG. 7 illustrates that two Mexican hat type wind gusts (after approx. 10 seconds and 65 seconds respectively) are predicted, whereas other variations do not lead to this prediction. After approx. 85 seconds, another sine-like variation of the wind speed occurs, which however is not detected as a wind gust. In this example, there are mainly two reasons for the fact that this variation is not detected as a wind gust: firstly, the wind speed variation is much slower than in the wind gusts the control system is trained to recognize and predict. Secondly, this variation does not display the slight decrease before the increase, whereas the neural network was trained to recognize Mexican hat wind gusts. It should be clear however, that, if it is decided that other wind speed profiles should also be predicted, by adapting the training process, an algorithm can be generated which confidently predicts this kind of wind speed variation as well. The invention is not limited in any way to predicting only Mexican hat wind gusts. The Mexican hat wind gust was merely chosen, since it generally is a dangerous phenomenon.

Figure 8:
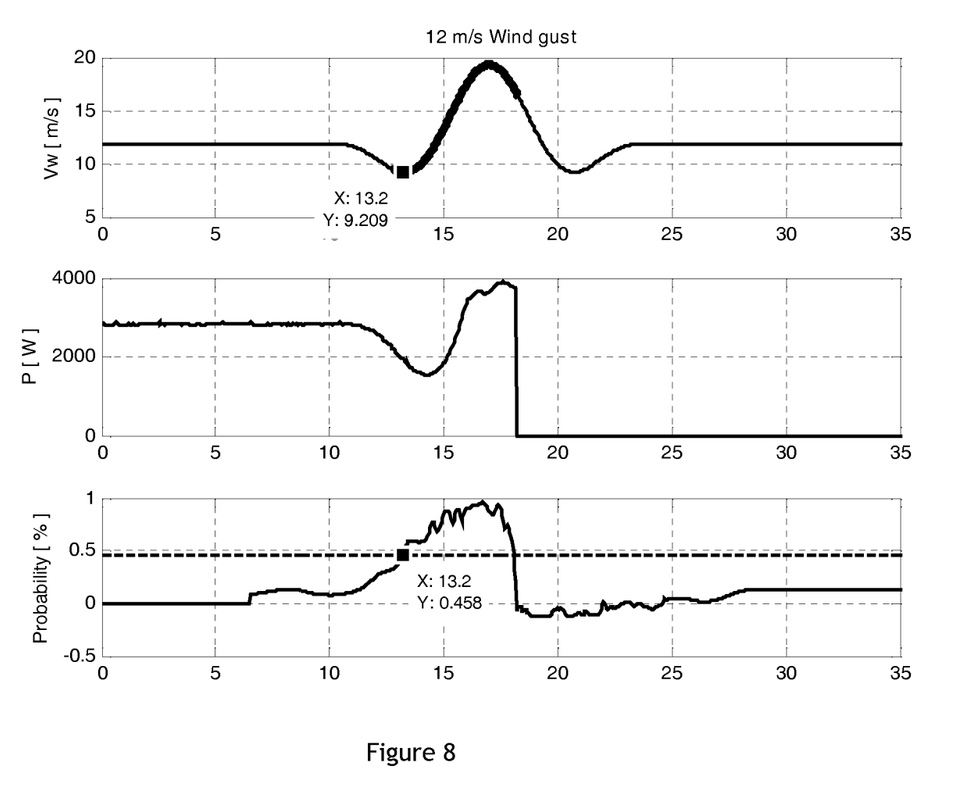
FIGS. 8 and 9 illustrate the prediction of a wind gust based on the measured wind speed and generator power using methods according to the present invention.
Figure 9:
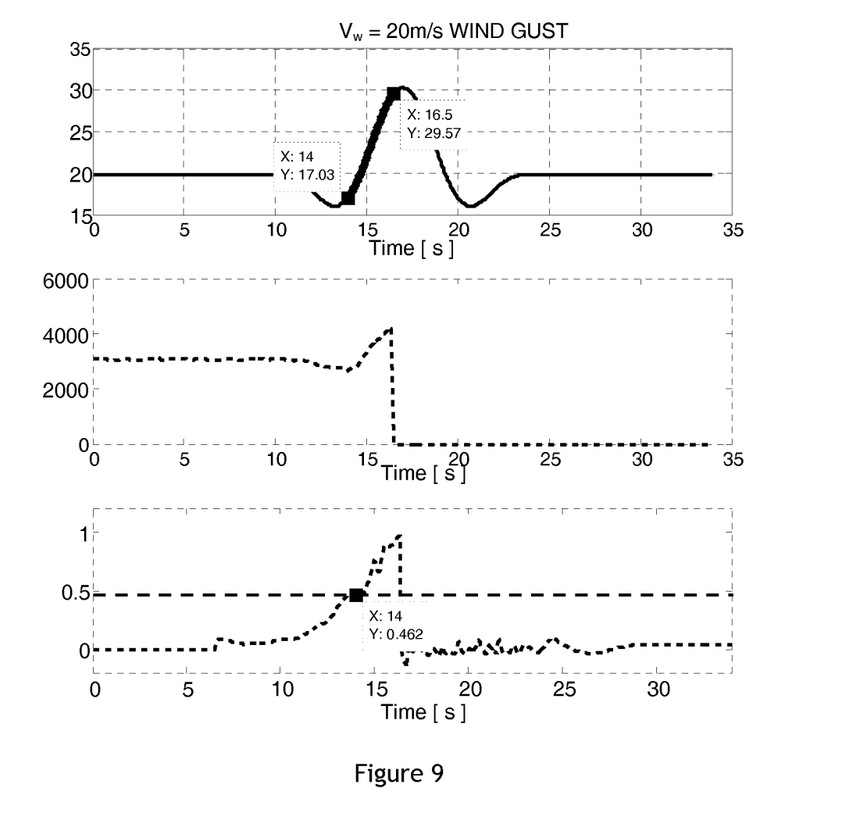

So far, only one parameter was used as input for the method of predicting the occurrence of a wind gust. However, the method of predicting the occurrence of a wind gust is not limited in this respect. FIGS. 8 and 9 illustrate the prediction of a wind gust based on the measured wind speed and generator power using methods according to the present invention. Since input is obtained from two parameters, the probability threshold level may be set lower (in this case at 46%) and the occurrence of a wind gust can be determined more quickly. It can be seen in FIGS. 8 and 9 that the wind gust is predicted, before the significant increase in wind speed. For example, in FIG. 8, the wind gust is predicted (and the control can be adapted) after approximately 2.8 seconds.

Figure 10:
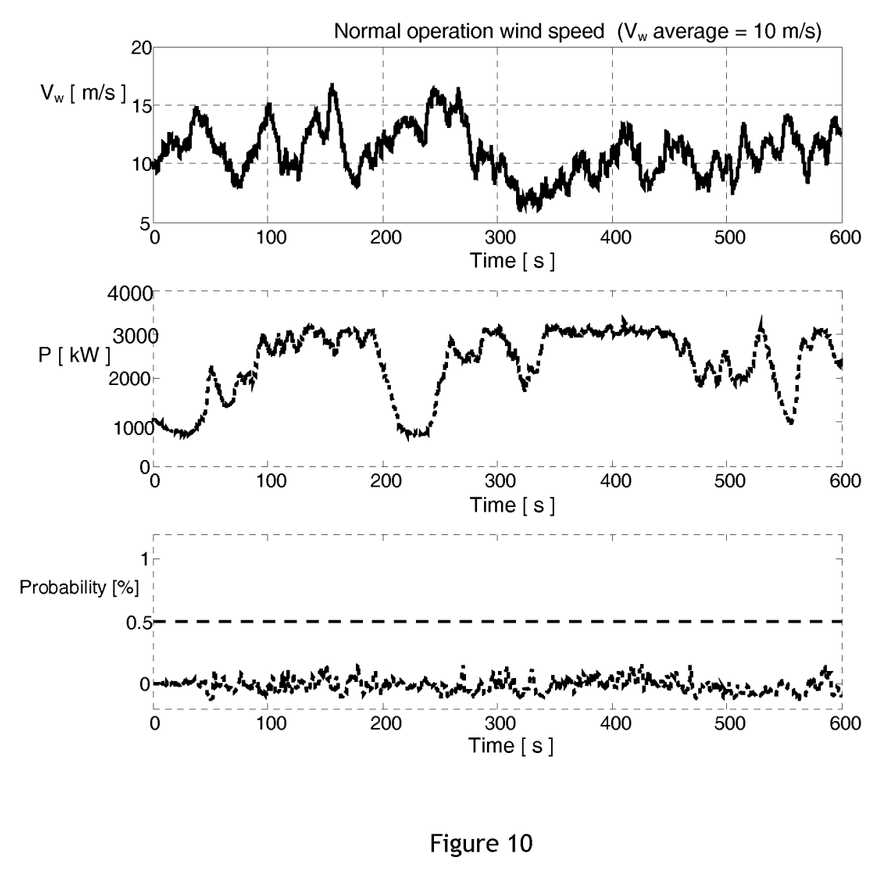
FIG. 10 illustrates that using a method according to the present invention normal wind speed variations are not detected as wind gusts.

FIG. 10 illustrates that with the determined algorithm, chosen parameters and chosen probability threshold, normal wind speed variations are not recognized as wind gusts and normal control of the wind turbine continues.

Figure 11:
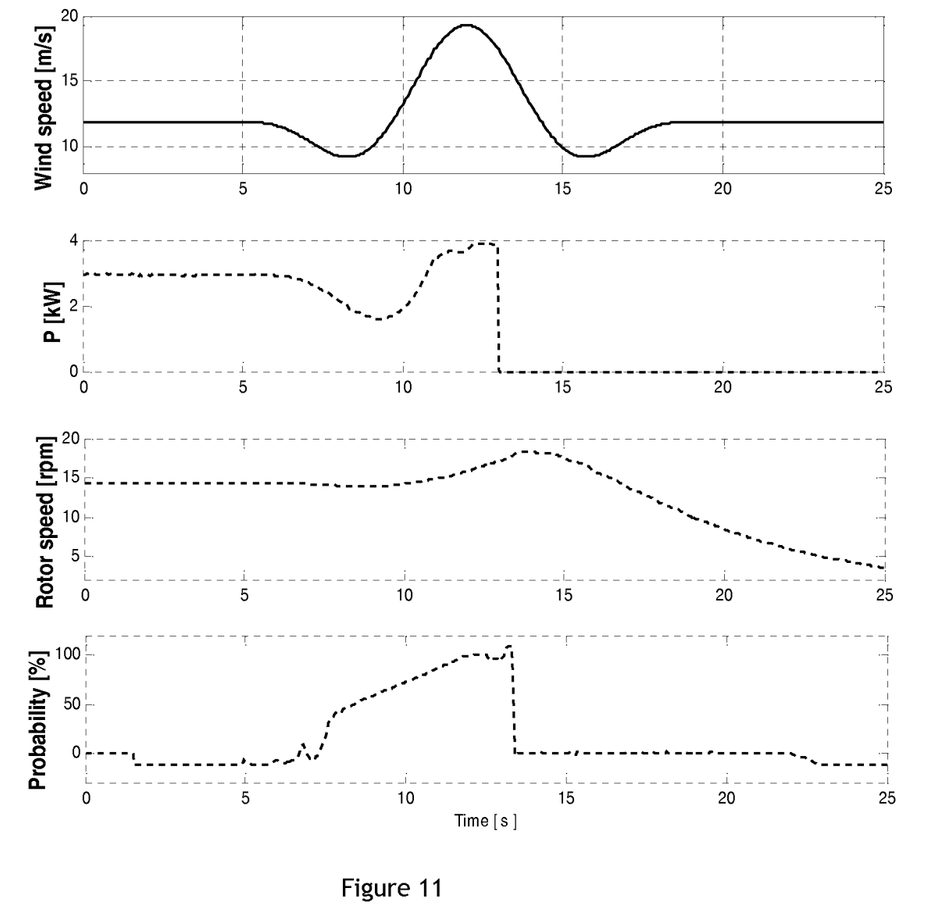
FIG. 11 illustrates the prediction of a wind gust based on wind speed, generator power and rotor speed using a method according to the present invention.

FIG. 11 illustrates the prediction of a wind gust based on wind speed, generator power and rotor speed using a method according to the present disclosure. Using three variables (instead of one or two variables) may increase the reliability of the wind gust prediction and may increase the speed with which a wind gust can be predicted. In FIG. 11, that using a probability threshold of e.g. 50%, the wind gust would have been detected at the first instance of the wind gust (when the wind speed is decreasing). Within the scope of the present disclosure, the probability threshold may be varied as well as the number of parameters that are taken into account.

Although this invention has been disclosed in the context of certain preferred embodiments and examples, it will be understood by those skilled in the art that the present disclosure extends beyond the specifically disclosed embodiments to other alternative embodiments and/or uses of the invention and obvious modifications and equivalents thereof. Thus, it is intended that the scope of the present disclosure should not be limited by the particular disclosed embodiments described before, but should be determined only by a fair reading of the claims that follow.

What is claimed is:

1. A method for predicting an impending wind gust at a wind turbine comprising:
    obtaining as input data, with a predetermined frequency, measured values of two or more parameters selected from wind speed, rotor speed and generator power of the wind turbine;
    selecting a group of input data of predetermined size consisting of the most recently obtained two or more selected parameters;
    calculating, via a computing device having a processor, the probability of an occurrence of a wind gust on the basis of said selected group of input data by determining the resemblance of the selected group of input data with data of the two or more selected parameters, wherein the data of the two or more selected parameters being used to determine the resemblance comprises predetermined patterns of the two or more selected parameters during one or more predetermined wind gusts conditions;
    verifying if the calculated probability of the occurrence of a wind gust is above a predetermined probability level; and
    predicting the occurrence of a wind gust if the calculated probability is above said predetermined probability level.

2. The method of claim 1, wherein the predetermined patterns to determine the resemblance are predetermined wind gusts as defined in the standard IEC 61400.

3. The method of claim 1, wherein determining the resemblance of the input data with data of the selected parameters relating to the one or more predetermined wind gust comprises using an algorithm obtained with an artificial neural network.

4. The method of claim wherein the two or more selected parameters are wind speed measured at the nacelle of the wind turbine and generator power.

5. The method of claim 1, wherein said predetermined frequency is one of between 10 and 1000 times per second, between 10 and 100 times per second, or approximately 20 times per second.

6. The method of claim 1, wherein said group of input data of predetermined size covers a period of between 2 and 8 seconds.

7. The method of claim 1, wherein said predetermined probability level is between approximately 40% and approximately 85%.

8. The method of claim 1, further comprising:
    when the occurrence of a wind gust is predicted, adapting one of a pitch control and generator torque of the wind turbine to such a wind gust.

9. A non-transitory computer-readable medium having computer-executable instructions embodied thereon that, when executed by a computing device having a processor, perform a method of predicting the occurrence of a wind gust according to claim 1.

10. A wind turbine, comprising:
    a wind turbine control system adapted to
        obtain as input data, with a predetermined frequency, measured values of two or more parameters selected from wind speed, rotor speed and generator power of the wind turbine;
        select a group of input data of predetermined size consisting of the most recently obtained two or more selected parameters;
        calculate the probability of an occurrence of a wind gust on the basis of said selected group of input data by determining the resemblance of the selected group of input data with data of the two or more selected parameters, wherein the data of the two or more selected parameters being used to determine the resemblance comprises predetermined patterns of the two or more selected parameters during one or more predetermined wind gusts conditions,
        verify if the calculated probability of the occurrence of a wind gust is above a predetermined probability level; and
        predict the occurrence of a wind gust if the calculated probability is above said predetermined probability level.

* * * * *